United States Patent [19]

Smith

[11] 4,095,809
[45] Jun. 20, 1978

[54] SNAP-IN FLANGE SEAL

[76] Inventor: Franklyn D. Smith, 88 W. Jackson St., Hayward, Calif. 94544

[21] Appl. No.: 730,223

[22] Filed: Oct. 6, 1976

Related U.S. Application Data

[62] Division of Ser. No. 630,972, Nov. 12, 1975, Pat. No. 4,002,344.

[51] Int. Cl.² ............................................. F16J 15/06
[52] U.S. Cl. ...................................... 277/180; 277/11
[58] Field of Search ............................... 277/180–189, 277/11

[56] References Cited

U.S. PATENT DOCUMENTS

| 3,167,322 | 1/1965 | Aichroth | 277/180 |
| 3,279,805 | 10/1966 | Quinson | 277/180 |
| 3,467,398 | 9/1969 | Bernard | 277/198 |

Primary Examiner—Robert I. Smith
Attorney, Agent, or Firm—Julian Caplan

[57] ABSTRACT

An annular seal is placed between the flanges of two pipes or conduits to seal against high pressure or vacuum. A flat inner ring has the inside diameter of the pipe and is formed on its outer edge with a truncated V groove. A flat outer ring has an inside diameter slightly greater than the outside diameter of the inner ring and its inner edge is also formed with a truncated V groove. A circular cross-section O ring is received in the two grooves, its unstressed diameter being greater than the thickness of the flat rings so that when the seal is placed between two flanges the O ring flexes to partially fill the grooves and to seal against both flanges. To locate the annular seal accurately a thin locating ring surrounds the annular seal and is detachably secured thereto by lugs which fit into a groove in the external edge of the outer flat ring. The locating ring has a pair of opposed ears which are slotted or otherwise apertured to receive the bolts which draw the pipe flanges together. Since the flanges and bolt hole circles may be of varying diameters depending upon the designed pressure for pipes of the same nominal inside diameter, the slots or apertures are shaped to center the seal for several different size flanges.

1 Claim, 5 Drawing Figures

SNAP-IN FLANGE SEAL

This is a division of application Ser. No. 630,972, filed Nov. 12, 1975, now U.S. Pat. No. 4,002,344.

This invention relates to a new and improved flange seal and snap-in locator. More particularly, the invention relates to an annular seal to fit between the flanges of high pressure or high vacuum pipes to seal the same. The annular seal has an inner ring and an outer ring with an O ring interposed and fitting partially within truncated V-shaped notches in the opposed edges of the two rings. When the flanges are drawn together, the O ring is deformed and partially fills the truncated V-shaped notches. A tight seal of the edges of the O ring against both flanges is achieved. In order to locate the annular seal accurately relative to the central axis of the pipe, the annular seal may be snapped into a locator which fits around the outside thereof and can be used to center the assembly relative either to the bolt holes in the flanges or the external edge of the flanges.

Accordingly, a principal purpose of the present invention is the provision of a means which may be used with an annular seal to locate such seal relative to the central axis of the pipe. Thus the accuracy of location and the elimination of the possibility that the seal projects into the pipe opening is eliminated; and further, the O ring of the annular seal is accurately centered relative to the central axis of the pipe.

Another feature of the invention is the fact that the bolt holes and the bolts which are used to draw the flanges together function in cooperation with the locator to center the assembly. It will be understood, that for different pipe pressures the size of the flange, the bolt circle on which the bolts are located and the size of the bolts themselves vary. The locator of the present invention accommodates different flange sizes, bolt circles and bolt diameters.

A second means which is incorporated in the locator is a series of arcuate scribe marks on a projecting ear of the locator which are concentric with the pipe axis and line up with the outside diameter of the flange. Thus the workman may hold a tab on a projecting ear of the locator and line up a scribe mark with the outside edge of the flange and be assured that the seal is accurately centered. A further feature of the invention is the fact that the tab is weakened in notches so that it can be torn off by the workman after the flanges have been drawn together by tightening the flange bolts.

Another feature of the invention is that the locator and the annular seal are preferably separable and can be snapped together. Thus different types of seals for different fluids in the pipe (e.g.) or different makes of seals may be used with a uniform locator.

Another feature of the invention relates to the shape of the grooves in the opposed surfaces of the inner and outer rings of the annular seal. Heretofore V-shaped grooves have been used in conjunction with O rings. However, the grooves of the present invention are truncated. Hence the relative volumes of the two grooves in relation to the volume of the O ring is more carefully controlled and the effectiveness of the seal of the distorted O ring against the flanges is likewise more carefully controlled.

Other objects of the present invention will become apparent upon reading the following specification and referring to the accompanying drawings in which similar characters of reference represent corresponding parts in each of the several views.

Figure 1:
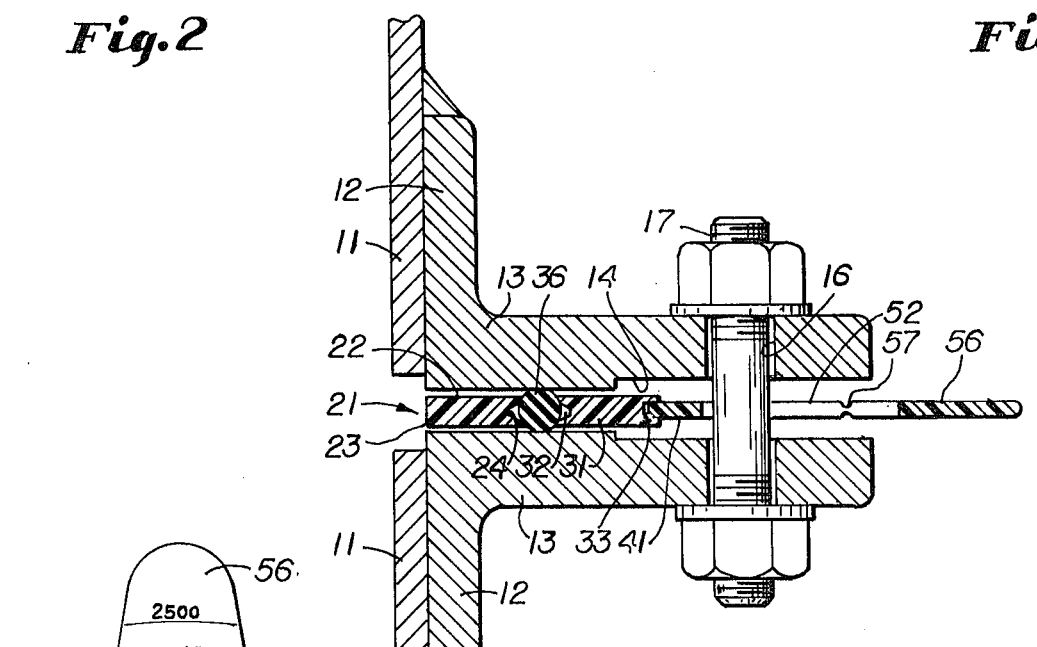
FIG. 1 is a somewhat schematic partial sectional view through the flanges of two pipes showing the seal and locator of the present invention in place.

Typical high pressure or high vacuum pipes 11 have hubs 12 welded or otherwise attached thereto with flanges 13 extending therefrom. In the form of flange 13 shown in FIG. 1, steps 14 are formed in the inner faces of the flanges to insure that when the flanges are tightened the seal will seat properly. Holes 16 are formed adjacent the outer edges of the flanges 13 and the opposed flanges are drawn together by bolts 17 or other conventional means well understood in this art. By comparison of FIGS. 2 and 3, it will be seen that for different pipe pressures, although the inside diameter of pipe 11 remains the same, the outside diameter of flange 13 or 13a may vary and the radius of the circle on which the holes 16 or 16a are formed may likewise vary. The number of bolts 17 and the diameter of the bolts 17 and hence the diameter of the holes 16 or 16a is also subject to variation. These variations are controlled by standards adopted by governmental codes or engineering societies. It is an important feature of the present invention that different flanges are accommodated.

Figure 4:
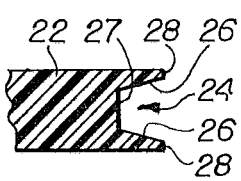
FIG. 4 is a fragmentary sectional view through the edge of one of the rings of the seal.

In order to seal the flanges 13 against pressure or vacuum, an annular seal 21 is employed. Seal 21 has an inner ring 22 formed of thin metal or plastic having an inside diameter 23 which is no less than the diameter of pipe 11 and preferably is equal to the inside diameter of hub 12. The ring 22 is flat and thin and of a thickness of about ⅛ inch. A groove 24 is formed on the outside edge of ring 22. As shown in FIG. 4, groove 24 is of a truncated V shape. The sides 26 thereof slant inwardly at an angle of about 15° relative to the top and bottom faces of ring 22. The bottom 27 of the groove is parallel to the axis of the ring. The outer edges 28 of the ring are very thin, being about 0.010 inch. The depth of the groove is about 0.0835 inch. In a preferred form of the invention the annular ring 22 has a thickness of about ⅛ inch and is formed of epoxy glass fabric, Nema type G-10.

Surrounding ring 22 is outer annular ring 31 which is formed of similar material and is of similar thickness. Ring 31 is formed with a groove 32 in its inside edge which is complemental to groove 24. Fitting partially within the grooves 24 and 32 is an O ring 36 which in its unstressed condition is of a diameter considerably greater than the thickness of the rings 32, 31. When the flanges 13 are brought together, the ring 36 deforms and partially fills the grooves 24, 32.

Figure 2:
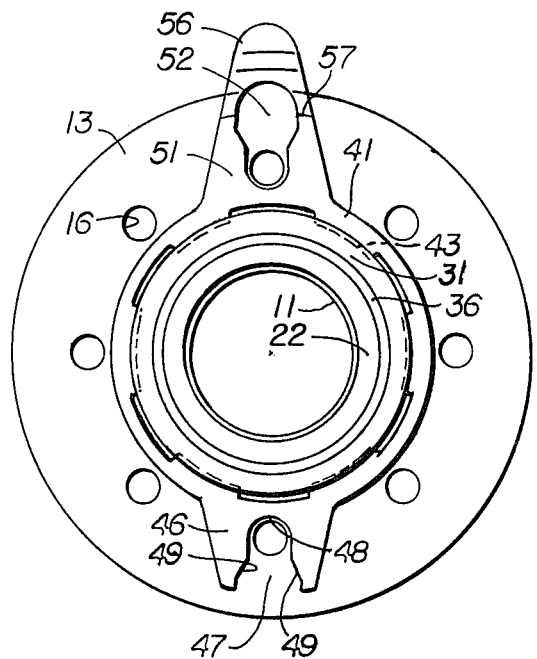
FIG. 2 is an elevational view showing the seal and locator in place relative to a small diameter flange for relatively low pressure pipes.
Figure 3:
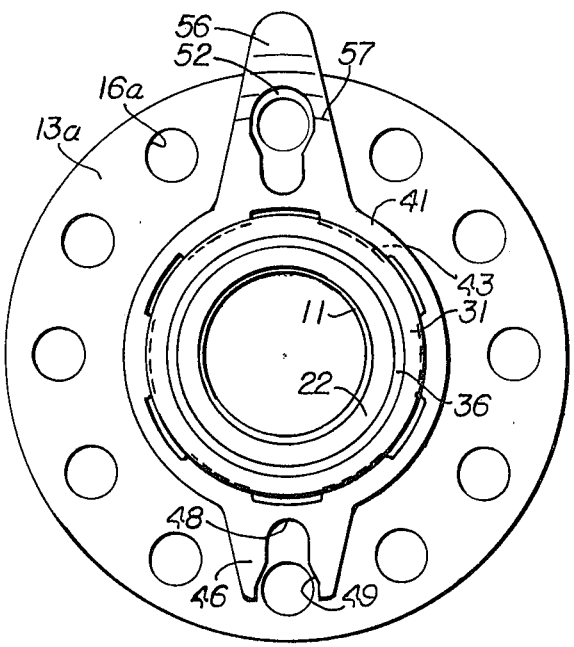
FIG. 3 is a view similar to FIG. 2 showing the locator in place against the flange of a larger size for higher pressure pipe.

The ring 31 is formed with a groove 33 on its outer edge which may be similar to the groove 32. Locator 41 comprises a ring of thin plastic material such as polyethylene which has an inside diameter 42 slightly greater than the outside diameter of ring 31 and is also formed with arcuately spaced lugs 43 on the inside diameter which snap into the groove 33 by reason of the resilient nature of the locator 41. Extending radially from locator 41 is a first ear 46 which is formed with a radial slot 47 extending inward from the outer edge of ear 46. The inner wall of slot 47 is formed with an inner radius 48. Outwardly of radius 48 are slanged sides 49. Directing attention to FIGS. 2 and 3, for a small diameter bolt hole 16, as shown in FIG. 2, the radius 28 is tangent thereto. As shown in FIG. 3, the slanted sides 49 are tangent to the large bolt holes 16a. Thus a single locator 41 will serve to locate relative to a plurality of different flanges 13 or 13a having different bolt circles and different bolt hole diameters.

Figure 5:
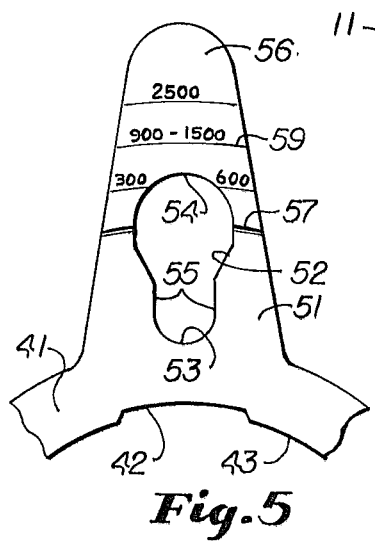
FIG. 5 is an enlarged fragmentary plan view of a portion of one of the ears of the locator and its detachable tab.

Diametrically opposed to first ear 46 is second ear 51. Although the second ear 51 may be identical to the ear 46, in a preferred form of the invention, as best shown in FIG. 5, it is formed with a keyhole shaped aperture 52. The inner radius 53 of aperture 52 is similar to the radius 48 of ear 46. Parallel sides 55 of the aperture 52 connecting with the outer radius portion 54 is of a diameter such that it accommodates the same bolt hole 16a as the slanted sides 49 of first ear 46, 49. Extending outward beyond radius 54 is a tab 56. Notches 57 are cut into the ear 51 about at the widest part of aperture 52 and these notches enable the tab 56 to be snapped off after the flanges have been drawn tight. Thus the workman holds onto the tab 56 and can move the locator 41 and also the seal 21 which is held thereby so that the assembly is accurately centered and then break off the tab 56 at the notches 57. An alternate means of using the locator 51 is the use of scribed arcs 59 which are either cut into or embossed on the tabs 51. For different pressures (as indicated by legends near the scribe marks 59) different outside diameter flanges 13, 13a are required. The scribed arcs 59 are used by the workman to line up with the outside edge of the flange. Then the bolts 17 are tightened and the tabs 56 broken off. Instead of scribed arcs 59, silk-screened or printed on embossed markings may be used. Legends 61 (as shown in FIG. 5) may be applied near the marks 59.

Accordingly, the present invention accommodates different line pressures or vacuums and the seal therefor is accurately centered relative to the axis of the pipes. Because of pressure variations the design of the flanges of the hubs of the pipes vary but the centering device accommodates wide variations.

Accordingly in use, the proper seal 21 is selected. The proper O ring 36 is installed between the inner and outer rings 22, 31, portions fitting into the grooves 24, 32. The seal is installed between flanges 13. The tab 46 or 51 is used in one of several ways. If the bolts 16 are in a small radius bolt circle, the surface 48 is placed so that it is tangent to the inside of one of the circles 16. Thereupon, the bolts are inserted through the flanges and drawn tight. Alternatively, if the bolt holes 16a are at a greater radius and the diameters of the holes 16a is greater than the diameter of the holes 16, said tab 46 or 51 is moved so that the surfaces 49 are tangent to a hole 16a and the procedure of joining the flanges is repeated. As a third alternative, the tab 56 is grasped and the portions of the holes 52 are brought into tangency with the holes 16 or 16a as in the preceding modification, the flanges drawn tight by means of the bolts 17 and the tab 56 broken off at the notches 57. As a final alternative, the tab 56 may be gripped and the lines 59 brought into a position so that they coincide with the outside diameter of the flange 13.

What is claimed is:

1. A seal for two abutting flat surfaces having means to draw said surfaces together comprising an inner member, an outer member of the same thickness and being in the same plane as said inner member, said members being relatively non-resilient and having flat, uninterrupted top and bottom surfaces, both said members being continuous and having no split, said members being separated from each other by a gap, each said member having an edge facing said gap, each said edge having a groove extending away from said gap at the midplane of said edge and said edge having axially disposed thin top and bottom axial surfaces between said groove and the top and bottom surfaces of said members, each said groove in cross-section having a truncated V-shape with the sides of said V disposed at approximately a 15° angle to the top and bottom surfaces of said members, and a circular cross-section rubber-like O-ring in said gap and partially in each said groove, the volume of said O-ring relative to said gap, the thickness of said members and the volume of said grooves being such that, when said O-ring is fully compressed by said flat surfaces being drawn together, said inner and outer members not being deformed and the top and bottom edges of said O-ring projecting above the top and bottom surfaces of said members and said O-ring substantially filling said grooves and said gap, said O-ring not being permanently deformed by being thus fully stressed, said rings being proportioned so that the ratio of $a/b = 0.0835/0.125$, approximately, and the ratio of $c/b = 0.010/0.125$, approximately, where "a" is the depth of said groove inward from said edge, "b" is the thickness of either said inner or outer member and "c" is the width of said thin top and bottom surfaces of said member.

* * * * *